US 6,480,151 B2

(12) United States Patent
Maalouf et al.

(10) Patent No.: US 6,480,151 B2
(45) Date of Patent: Nov. 12, 2002

(54) GPS RECEIVER INTERFERENCE NULLER WITH NO SATELLITE SIGNAL DISTORTION

(75) Inventors: Khalil J. Maalouf, Clifton Park; Jeffrey M. Ashe, Gloversville, both of NY (US); Naofal Al-Dhahir, Morristown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/035,676

(22) Filed: Dec. 28, 2001

(65) Prior Publication Data

US 2002/0122002 A1 Sep. 5, 2002

Related U.S. Application Data

(60) Provisional application No. 60/259,121, filed on Dec. 29, 2000.

(51) Int. Cl.[7] .................................. H04B 7/185
(52) U.S. Cl. ................................. 342/357.12
(58) Field of Search ................ 342/357.02, 357.06, 342/357.12; 455/63, 65, 67.3

(56) References Cited

U.S. PATENT DOCUMENTS

| | | |
|---|---|---|
| 4,105,977 A | 8/1978 | Fitting et al. |
| 4,217,586 A | 8/1980 | McGuffin |
| 4,268,829 A | 5/1981 | Baurle et al. |
| 4,280,128 A | 7/1981 | Masak |
| 4,439,769 A | 3/1984 | Masak |
| 4,635,063 A | 1/1987 | Chang et al. |
| 4,641,259 A | 2/1987 | Shan et al. |
| 4,734,701 A | 3/1988 | Grobert |
| 4,747,068 A | 5/1988 | Voorman et al. |
| 4,791,390 A | 12/1988 | Harris et al. |
| 4,811,261 A | 3/1989 | Kobayashi et al. |
| 5,014,232 A | 5/1991 | Andre |
| 5,303,173 A | 4/1994 | Mori et al. |
| 5,500,874 A | 3/1996 | Terrell |
| 5,524,125 A | 6/1996 | Tsujimoto |
| 5,590,154 A | 12/1996 | Forni et al. |
| 5,598,433 A | 1/1997 | Kaku et al. |
| 5,640,418 A | 6/1997 | Tanaka |
| 5,644,596 A | 7/1997 | Sih |
| 5,648,987 A | 7/1997 | Yang et al. |
| 5,650,785 A | 7/1997 | Rodal |
| 5,657,349 A | 8/1997 | Sugiyama |
| 5,661,528 A | 8/1997 | Han |
| 5,712,641 A | 1/1998 | Casabona et al. |
| 5,748,144 A | 5/1998 | Rodal |
| 5,761,383 A | 6/1998 | Engel et al. |
| 5,768,313 A | 6/1998 | Kuribayashi |
| 5,781,156 A | 7/1998 | Krasner |
| 5,872,540 A | 2/1999 | Casabona et al. |
| 5,901,175 A | 5/1999 | Limberg |
| 5,914,983 A | 6/1999 | Bowser et al. |
| 5,952,965 A | 9/1999 | Kowalski |
| 5,955,987 A | 9/1999 | Murphy et al. |

Primary Examiner—Dao Phan
(74) Attorney, Agent, or Firm—Finnegan, Henderson, Farabow, Garrett & Dunner, L.L.P.

(57) ABSTRACT

Interference in a GPS receiver in minimized while preserving the GPS satellite signal in a system having N antenna elements for receiving the interference signal and the satellite signal and multiple tapped delay line structures connected to the antenna elements for filtering the signals received by the antenna elements based a plurality of filter coefficients. The filter coefficients are determined such that the plurality of filter coefficients equals $R_{\overline{xx}}^{-1}C[C^{H}R_{\overline{xx}}^{-1}C]^{-1}F$ wherein $C^{H}\tilde{w}=F$, where $\tilde{w}$ equals the plurality of filter coefficients, $R_{\overline{xx}}$ equals a covariance matrix, and C and F are determined to preserve a frequency spectrum of the GPS satellite signal.

21 Claims, 1 Drawing Sheet

GPS RECEIVER INTERFERENCE NULLER WITH NO SATELLITE SIGNAL DISTORTION

CROSS-REFERENCE TO RELATED APPLICATION

This application claims the priority benefit of U.S. Provisional Application No. 60/259,121, filed on Dec. 29, 2000, which is incorporated herein by reference.

FIELD OF THE INVENTION

The present invention relates to a method and apparatus for filtering interference signals in a GPS environment without introducing satellite signal distortion.

BACKGROUND OF THE INVENTION

GPS (Global Positioning System) is a worldwide satellite-based navigational system consisting of a network of satellites that continuously transmit coded signals. GPS receivers receive and process these coded signals to determine position, velocity, and time. The GPS receivers may be used in many devices such as navigational devices and tracking devices. Although GPS was originally developed for use by the military, its use in commercial applications has increased dramatically over the past few years in areas such as automobile navigation, vehicle location, private and commercial aircraft navigation and landing systems, and surveying and precise timing systems.

Unfortunately, the coded signals transmitted by GPS are susceptible to interference, both unintentional and intentional, due to the low power level of the satellite signals. Unintentional interference may result from cellular phones and television station transmitting antennas. Intentional interference (i.e., jamming) results from signals intentionally produced to interfere with the satellite signals. When interference occurs, the performance of devices that rely on the satellite signals degrade. To maintain or improve the performance of these devices in the presence of interference, GPS receivers must be designed to cancel or minimize the interference.

In conventional multi-channel GPS receivers, channels may be individually filtered and then summed to minimize the effect of interference and to enhance the satellite signal-to-noise ratio. However, these GPS receivers do not guarantee the integrity of the frequency components of the satellite signal and can result in degraded GPS performance even when the interference is cancelled. Accordingly, there is a need to minimize interference effects while minimizing or eliminating satellite signal distortion.

SUMMARY OF THE INVENTION

There is provided a method for minimizing an effect of at least one interference signal while minimizing the distortion of at least one GPS satellite signal. The method comprises receiving the at least one interference signal and the at least one GPS satellite signal by a plurality of antenna elements and processing the received signals. The method further comprises filtering the received processed signals by a plurality of multiple tapped delay line structures based a plurality of filter coefficients. Still further, the method comprises determining the plurality of filter coefficients such that the plurality of filter coefficients equals $R_{xx}^{-1}C[C^{H}R_{xx}^{-1}C]^{-1}F$ wherein $C^H\tilde{w}=F$, where $\tilde{w}$ equals the plurality of filter coefficients, $R_{xx}$ equals a covariance matrix, and C and F are determined to preserve a frequency spectrum of the at least one GPS satellite signal.

Additional advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWING

The accompanying drawing, which is incorporated in and constitutes a part of this specification, illustrates one exemplary embodiment of the invention and together with the description, serves to explain the principles of the invention.

DESCRIPTION OF THE EMBODIMENTS

Figure 1:
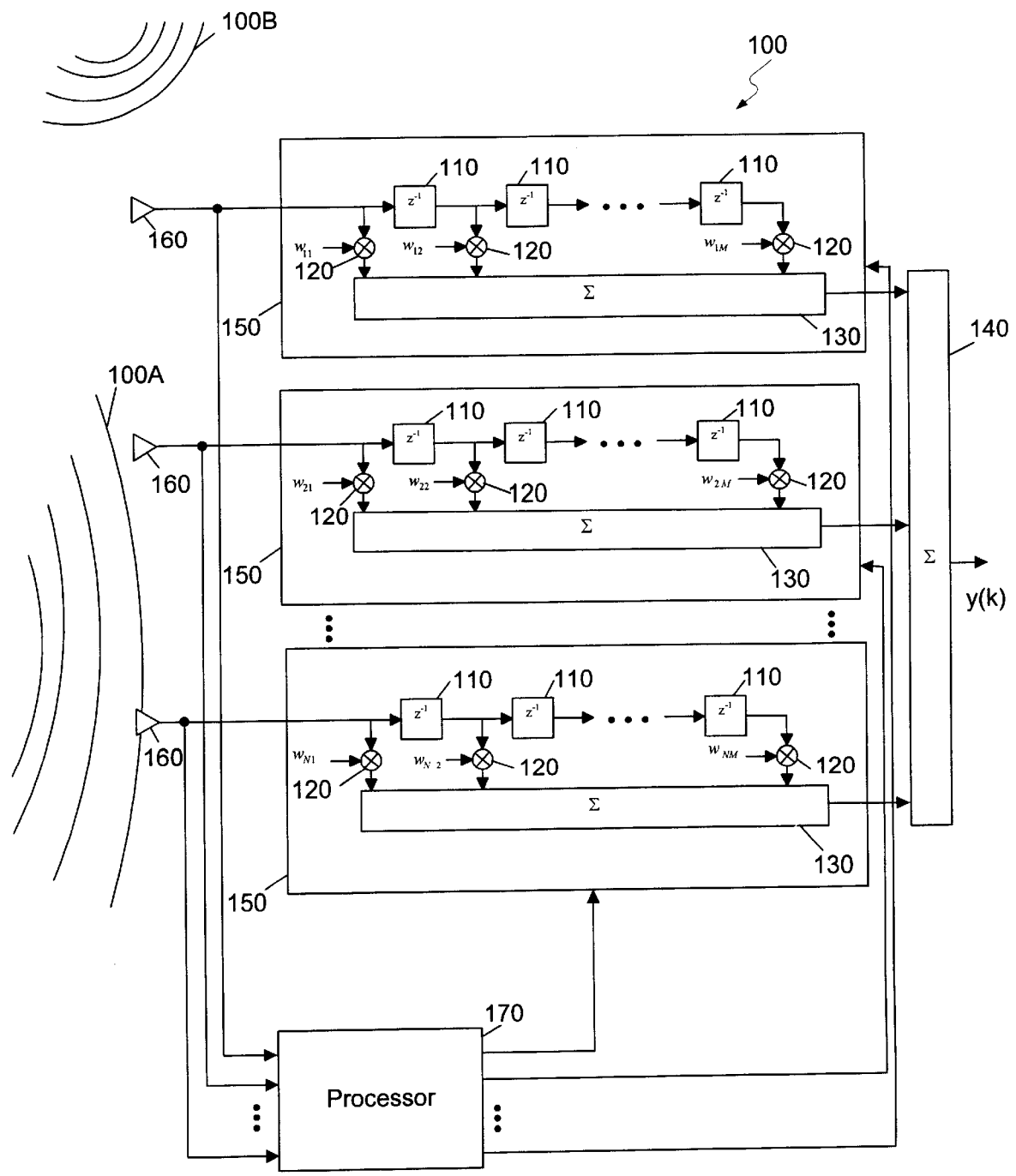
FIG. 1 illustrates an exemplary spatial temporal adaptive processing (STAP) beamformer for use in a GPS receiver for canceling the effects of interference in a GPS environment.

Reference will now be made in detail to the present exemplary embodiments of the invention.

FIG. 1 illustrates an exemplary spatial temporal adaptive processing (STAP) beamformer 100 for use in a GPS receiver for canceling the effects of interference in a GPS environment. The beamformer 100 may comprise N antenna elements 160 to receive one or more satellite signals 100A arriving at the antenna elements 160 in one or more directions. In addition to satellite signals 100A, the N antenna elements may also receive one or more interference signals 100B arriving at the antenna elements 160 from one or more different directions than the directions of the satellite signals 100A. Each antenna element 160 is connected to a multiple tapped delay line structure 150 comprising M taps. Each of the multiple tapped delay line structures 150 may comprise M−1 delay elements 110, M multipliers 120, and an adder 130. Generally, each of the multiple tapped delay structures 150 may be a FIR filter.

Although not shown in FIG. 1, the signals 100A, 100B received by each antenna elements 160 may undergo pre-processing prior to being received by the multiple tapped delay line structures 150 and a processor 170. For example, signals received by each antenna elements 160 may be filtered by a preselection filter and down-converted to baseband or other IF frequency. Further, the signals may be filtered by a bandlimited filter and sampled by an analog-to-digital converter prior. Still further, the baseband filtered sampled signals may be further converted to complex baseband signals by digital demodulation or Hilbert transform type processing, for example, prior to being input to the multiple tapped delay line structures 150 and the processor 170.

The beamformer 100 receives input signals and computes filter coefficients, $w_{nm}$, which are applied to the multiple tapped delay line structures 150 for processing the input signals. The filter coefficients, $w_{nm}$, are computed by a coefficient processor 170, which will be discussed in greater detail below. The outputs from the multiple tapped delay line structures 150 are then summed together by an adder 140 to generate output samples, y(k).

The output samples, y(k), of the beamformer 100 may be expressed by the following equation:

$$y(k) = \sum_{n=1}^{N}\sum_{m=1}^{M} w_{nm}^* x_n(k+M-m) \qquad (1)$$

where $x_n(k)$ denotes a complex input sample from the n-th antenna element at time k. It is assumed that at the n-th antenna element, the satellite signal is multiplied by a factor $e^{-j\Delta_n}$. The exponent factor, $\Delta_n$, depends on the angle of arrival of the satellite signal, the carrier frequency of the satellite signal, and the position of the n-th antenna element. More specifically, $\Delta_n=\omega_c\tau_n$, where $\omega_c$ is the carrier frequency of the satellite signal and $\tau_n$ is the inter-element time delay at antenna element n. If the steering vector for a given satellite direction is denoted by $[e^{-j\Delta_1}e^{-j\Delta_2}\ldots e^{-j\Delta_N}]$, then the input samples, $x_n(k)$, may be expressed in the z-space by the following equation:

$$X_n(z)=e^{-j\Delta_n}e^{-j\bar{\omega}\tau_n}V(z) \quad (2)$$

where $\omega$ is the baseband frequency; $\tau_n$ is the inter-element time delay at antenna element n; and V(z) is the z-space representation of the satellite signal at a first element.

To minimize the effects of interference signals 100B on the GPS receiver, the expected power, P, of the complex output samples, y(k), of the beamformer 100 may be minimized according the following equation:

$$P = E\{|y(k)|^2\} = E\left\{\left(\sum_{n=1}^{N}\sum_{m=1}^{M} w_{nm}^* x_n(k+M-m)\right)\left(\sum_{i=1}^{N}\sum_{j=1}^{M} w_{ij} x_i^*(k+M-j)\right)\right\}$$

$$= E\left\{\sum_{n=1}^{N}\sum_{m=1}^{M}\sum_{j=1}^{M}\sum_{i=1}^{N} w_{nm}^* x_n(k+M-m) x_i^*(k+M-j) w_{ij}\right\} \quad (3)$$

The expected power, P, may be simplified by rearranging the input samples and weights into the following (N×M)×1 vectors:

$$\tilde{x}(k) = \begin{bmatrix} x_1(k+M-1) \\ x_1(k+M-2) \\ \vdots \\ x_1(k) \\ x_2(k+M-1) \\ x_2(k+M-2) \\ \vdots \\ x_2(k) \\ \vdots \\ x_N(k+M-1) \\ x_N(k+M-2) \\ \vdots \\ x_N(k) \end{bmatrix} \quad (4)$$

and $$\tilde{w} = \begin{bmatrix} w_{11} \\ w_{12} \\ \vdots \\ w_{1M} \\ w_{21} \\ w_{22} \\ \vdots \\ w_{2M} \\ \vdots \\ w_{N1} \\ w_{N2} \\ \vdots \\ w_{NM} \end{bmatrix} \quad (5)$$

In matrix notation, the output samples, y(k), of the beamformer 100 may be expressed as follows:

$$y(k)=\tilde{w}^H \tilde{x}(k) \quad (6)$$

The resulting expected output power, P, is given by:

$$P=E\{|y(k)|^2\}=E\{(\tilde{w}^H\tilde{x}(k))(\tilde{x}^H(k)\tilde{w})\}=\tilde{w}^H E\{\tilde{x}(k)\tilde{x}^H(k)\}\tilde{w}=\tilde{w}^H R_{\bar{x}\bar{x}}\tilde{w} \quad (7)$$

where $R_{\bar{x}\bar{x}}$ is a covariance matrix. Before determining the minimum expected output power, P, at least one constraint may be imposed to avoid the trivial solution of zeros for the filter coefficients, $\tilde{w}$. Accordingly, equation (7) may be minimized subject to the following constraint:

$$C^H\tilde{w}=F \quad (8)$$

where C is a constraint weighting matrix and F is a constraint solution vector. The constraint weighting matrix, C, may be an (N×M)×L matrix and constraint solution vector, F, may be an L×1 matrix. Accordingly, the interference minimization problem my be characterized as follows:

minimize $P=\tilde{w}^H R_{\bar{x}\bar{x}}\tilde{w}$ subject to $C^H\tilde{w}=F$ The filter coefficients, $\tilde{w}$, that may solve the interference minimization problem may be determined by the following equation:

$$\tilde{w}=R_{\bar{x}\bar{x}}^{-1}C[C^H R_{\bar{x}\bar{x}}^{-1}C]^{-1}F \quad (9)$$

In a conventional power minimization technique, a typical constraint is to force the filter coefficient on the center tap of the first antenna element to be unity. All other filter coefficients are not included in the constraint, allowing the system to minimize the output power. In a conventional constrained power minimization technique, a typical constraint is to force the sum of the center tap filter coefficients scaled by the steering vector of all antenna elements 160 to be unity. All other filter coefficients are not included in the constraint, allowing the system to minimize the output power. Both techniques result in satellite signal distortion.

In an exemplary embodiment of the present invention, the interference minimization problem is constrained in the satellite signal direction to preserve the frequency spectrum of the satellite signal, which minimizes or eliminates satellite signal distortion. That is, in an exemplary embodiment of the present invention, the conventional constrained power minimization technique is modified by insuring an all pass condition in the frequency domain in the satellite signal direction. This is in contrast to conventional GPS interference minimization schemes that only maximize signal-to-noise ratio, which may distort the satellite signal.

When the satellite signal direction is at boresight or when the baseband frequencies are much smaller (i.e., when $\omega\tau_n<<2\pi$ and $\omega_c>>\omega$) than the satellite signal carrier frequency, then $\Delta_n>>\omega\tau_n$, and the output signal given by equation (1) reduces to the following FIR filter expression in V(k):

$$Y(z) = \sum_{n=1}^{N} \sum_{m=1}^{M} w_{nm}^* e^{-j\Delta_n} z^{-M+m} V(z) \quad (10)$$

$$= \sum_{m=1}^{M} c_m z^{-M+m} V(z)$$

where $$c_m = \sum_{n=1}^{N} w_{nm}^* e^{-j\Delta_n}.$$

The equation (10) corresponds to an FIR filter design with coefficients $c_m$. By setting one coefficient, $c_m$, equal to one and the rest equal to zero, an all pass condition is obtained.

Accordingly, for a beamformer 100 comprising five taps (i.e., M=5) and four antenna elements 160 (i.e., N=4), the constraint weighting matrix, C, and the constraint solution vector, F, may have the following form:

$$C = \begin{bmatrix} e^{-j\Delta_1} & 0 & 0 & 0 & 0 \\ 0 & e^{-j\Delta_1} & 0 & 0 & 0 \\ 0 & 0 & e^{-j\Delta_1} & 0 & 0 \\ 0 & 0 & 0 & e^{-j\Delta_1} & 0 \\ 0 & 0 & 0 & 0 & e^{-j\Delta_1} \\ e^{-j\Delta_2} & 0 & 0 & 0 & 0 \\ 0 & e^{-j\Delta_2} & 0 & 0 & 0 \\ 0 & 0 & e^{-j\Delta_2} & 0 & 0 \\ 0 & 0 & 0 & e^{-j\Delta_2} & 0 \\ 0 & 0 & 0 & 0 & e^{-j\Delta_2} \\ e^{-j\Delta_3} & 0 & 0 & 0 & 0 \\ 0 & e^{-j\Delta_3} & 0 & 0 & 0 \\ 0 & 0 & e^{-j\Delta_3} & 0 & 0 \\ 0 & 0 & 0 & e^{-j\Delta_3} & 0 \\ 0 & 0 & 0 & 0 & e^{-j\Delta_3} \\ e^{-j\Delta_4} & 0 & 0 & 0 & 0 \\ 0 & e^{-j\Delta_4} & 0 & 0 & 0 \\ 0 & 0 & e^{-j\Delta_4} & 0 & 0 \\ 0 & 0 & 0 & e^{-j\Delta_4} & 0 \\ 0 & 0 & 0 & 0 & e^{-j\Delta_4} \end{bmatrix} \text{ and} \quad (11)$$

$$F = \begin{bmatrix} 0 \\ 0 \\ 1 \\ 0 \\ 0 \end{bmatrix} \quad (12)$$

The constraint weighting matrix, C, and the constraint solution vector, F, of equations (11) and (12) result when coefficient $c_3=1$ and $c_m=0$ for m=1, 2, 4, and 5.

When a processed satellite signal received by the processor 170 does not occupy the full digital bandwidth, which may be is the case if the processed satellite signal is over-sampled, the constraint solution vector, F, which contains the coefficients, $c_m$, of the FIR filter, may be tappered to match the frequency response of the processed satellite signal. For example, if the satellite signal is over-sampled by two fold, a low pass filter design with a cut-off frequency equal to half the bandwidth of the satellite signal received by antenna elements 160 may be used to determine the constraint weighting matrix, C, and the constraint solution vector, F, which may be used to determine the filter coefficients, $\tilde{w}$, according to equation (9).

When $\omega\tau_n$ cannot be ignored, such as when the satellite signal direction is not at boresight or when the baseband frequency of the processed satellite signal is not much lower than the carrier frequency, then the constraint weighting matrix, C, and the constraint solution vector, F, may be chosen so that the beamformer 100 passes the frequency components of the satellite signal. More specifically, for each frequency component, $\omega_i$, of the satellite signal, equation (1) may be rewritten in the following form:

$$g_i = \sum_{n=1}^{N} \sum_{m=1}^{M} w_{nm}^* e^{-j\Delta_n} e^{-j\tilde{\omega}_i \tau_n} e^{j\tilde{\omega}_i kT_s} \quad (13)$$

where $T_s$ is the sampling rate. To minimize or eliminate satellite signal distortion, by allowing the beamformer 100 to pass the frequency component, $\omega_i$, of the satellite signal, the constraint $g_i$, may be set equal to one, for example. Accordingly, for a satellite signal having frequency components $\omega_1$, $\omega_2$, and $\omega_3$, the constraint weighting matrix, C, and the constraint solution vector, F, may have the following form:

$$C = \begin{bmatrix}
e^{-j\Delta_1}e^{-j\tilde{\omega}_1\tau_1} & e^{-j\Delta_1}e^{-j\tilde{\omega}_2\tau_1} & e^{-j\Delta_1}e^{-j\tilde{\omega}_3\tau_1} \\
e^{-j\Delta_1}e^{-j\tilde{\omega}_1\tau_1}e^{j\tilde{\omega}_1 Ts} & e^{-j\Delta_1}e^{-j\tilde{\omega}_2\tau_1}e^{j\tilde{\omega}_2 1Ts} & e^{-j\Delta_1}e^{-j\tilde{\omega}_3\tau_1}e^{j\tilde{\omega}_3 Ts} \\
e^{-j\Delta_1}e^{-j\tilde{\omega}_1\tau_1}e^{j\tilde{\omega}_1 2Ts} & e^{-j\Delta_1}e^{-j\tilde{\omega}_2\tau_1}e^{j\tilde{\omega}_2 2Ts} & e^{-j\Delta_1}e^{-j\tilde{\omega}_3\tau_1}e^{j\tilde{\omega}_3 2Ts} \\
e^{-j\Delta_1}e^{-j\tilde{\omega}_1\tau_1}e^{j\tilde{\omega}_1 3Ts} & e^{-j\Delta_1}e^{-j\tilde{\omega}_2\tau_1}e^{j\tilde{\omega}_2 3Ts} & e^{-j\Delta_1}e^{-j\tilde{\omega}_3\tau_1}e^{j\tilde{\omega}_3 3Ts} \\
e^{-j\Delta_1}e^{-j\tilde{\omega}_1\tau_1}e^{j\tilde{\omega}_1 4Ts} & e^{-j\Delta_1}e^{-j\tilde{\omega}_2\tau_1}e^{j\tilde{\omega}_2 4Ts} & e^{-j\Delta_1}e^{-j\tilde{\omega}_3\tau_1}e^{j\tilde{\omega}_3 4Ts} \\
e^{-j\Delta_2}e^{-j\tilde{\omega}_1\tau_2} & e^{-j\Delta_2}e^{-j\tilde{\omega}_2\tau_2} & e^{-j\Delta_2}e^{-j\tilde{\omega}_3\tau_2} \\
e^{-j\Delta_2}e^{-j\tilde{\omega}_1\tau_2}e^{j\tilde{\omega}_1 Ts} & e^{-j\Delta_2}e^{-j\tilde{\omega}_2\tau_2}e^{j\tilde{\omega}_2 Ts} & e^{-j\Delta_2}e^{-j\tilde{\omega}_3\tau_2}e^{j\tilde{\omega}_3 Ts} \\
e^{-j\Delta_2}e^{-j\tilde{\omega}_1\tau_2}e^{j\tilde{\omega}_1 2Ts} & e^{-j\Delta_2}e^{-j\tilde{\omega}_2\tau_2}e^{j\tilde{\omega}_2 2Ts} & e^{-j\Delta_2}e^{-j\tilde{\omega}_3\tau_2}e^{j\tilde{\omega}_3 2Ts} \\
e^{-j\Delta_2}e^{-j\tilde{\omega}_1\tau_2}e^{j\tilde{\omega}_1 3Ts} & e^{-j\Delta_2}e^{-j\tilde{\omega}_2\tau_2}e^{j\tilde{\omega}_2 3Ts} & e^{-j\Delta_2}e^{-j\tilde{\omega}_3\tau_2}e^{j\tilde{\omega}_3 3Ts} \\
e^{-j\Delta_2}e^{-j\tilde{\omega}_1\tau_2}e^{j\tilde{\omega}_1 4Ts} & e^{-j\Delta_2}e^{-j\tilde{\omega}_2\tau_2}e^{j\tilde{\omega}_2 4Ts} & e^{-j\Delta_2}e^{-j\tilde{\omega}_3\tau_2}e^{j\tilde{\omega}_3 4Ts} \\
e^{-j\Delta_3}e^{-j\tilde{\omega}_1\tau_3} & e^{-j\Delta_3}e^{-j\tilde{\omega}_2\tau_2} & e^{-j\Delta_3}e^{-j\tilde{\omega}_3\tau_3} \\
e^{-j\Delta_3}e^{-j\tilde{\omega}_1\tau_3}e^{j\tilde{\omega}_1 Ts} & e^{-j\Delta_3}e^{-j\tilde{\omega}_2\tau_3}e^{j\tilde{\omega}_2 Ts} & e^{-j\Delta_3}e^{-j\tilde{\omega}_3\tau_3}e^{j\tilde{\omega}_3 Ts} \\
e^{-j\Delta_3}e^{-j\tilde{\omega}_1\tau_3}e^{j\tilde{\omega}_1 2Ts} & e^{-j\Delta_3}e^{-j\tilde{\omega}_2\tau_3}e^{j\tilde{\omega}_2 2Ts} & e^{-j\Delta_3}e^{-j\tilde{\omega}_3\tau_3}e^{j\tilde{\omega}_3 2Ts} \\
e^{-j\Delta_3}e^{-j\tilde{\omega}_1\tau_3}e^{j\tilde{\omega}_1 3Ts} & e^{-j\Delta_3}e^{-j\tilde{\omega}_2\tau_3}e^{j\tilde{\omega}_2 3Ts} & e^{-j\Delta_3}e^{-j\tilde{\omega}_3\tau_3}e^{j\tilde{\omega}_3 3Ts} \\
e^{-j\Delta_3}e^{-j\tilde{\omega}_1\tau_3}e^{j\tilde{\omega}_1 4Ts} & e^{-j\Delta_3}e^{-j\tilde{\omega}_2\tau_3}e^{j\tilde{\omega}_2 4Ts} & e^{-j\Delta_3}e^{-j\tilde{\omega}_3\tau_3}e^{j\tilde{\omega}_3 4Ts} \\
e^{-j\Delta_4}e^{-j\tilde{\omega}_1\tau_4} & e^{-j\Delta_4}e^{-j\tilde{\omega}_2\tau_4} & e^{-j\Delta_4}e^{-j\tilde{\omega}_3\tau_4} \\
e^{-j\Delta_4}e^{-j\tilde{\omega}_1\tau_4}e^{j\tilde{\omega}_1 Ts} & e^{-j\Delta_4}e^{-j\tilde{\omega}_2\tau_4}e^{j\tilde{\omega}_2 Ts} & e^{-j\Delta_4}e^{-j\tilde{\omega}_3\tau_4}e^{j\tilde{\omega}_3 Ts} \\
e^{-j\Delta_4}e^{-j\tilde{\omega}_1\tau_4}e^{j\tilde{\omega}_1 2Ts} & e^{-j\Delta_4}e^{-j\tilde{\omega}_2\tau_4}e^{j\tilde{\omega}_2 2Ts} & e^{-j\Delta_4}e^{-j\tilde{\omega}_3\tau_4}e^{j\tilde{\omega}_3 2Ts} \\
e^{-j\Delta_4}e^{-j\tilde{\omega}_1\tau_4}e^{j\tilde{\omega}_1 3Ts} & e^{-j\Delta_4}e^{-j\tilde{\omega}_2\tau_4}e^{j\tilde{\omega}_2 3Ts} & e^{-j\Delta_4}e^{-j\tilde{\omega}_3\tau_4}e^{j\tilde{\omega}_3 3Ts} \\
e^{-j\Delta_4}e^{-j\tilde{\omega}_1\tau_4}e^{j\tilde{\omega}_1 4Ts} & e^{-j\Delta_4}e^{-j\tilde{\omega}_2\tau_4}e^{j\tilde{\omega}_2 4Ts} & e^{-j\Delta_4}e^{-j\tilde{\omega}_3\tau_4}e^{j\tilde{\omega}_3 4Ts}
\end{bmatrix} \quad (14)$$

and $$F = \begin{bmatrix} 1 \\ 1 \\ 1 \end{bmatrix} \quad (15)$$

To compute the optimum filter coefficients, $\tilde{w}$, conventional GPS receivers require powerful and expensive hardware designs. More specifically, as shown in equation (9), the filter coefficients, $\tilde{w}$, are a function of $R_{\overline{xx}}$, which equals $E\{\tilde{x}(k)\tilde{x}^H(k)\}$. Conventionally, to compute, $R_{\overline{xx}}$, a predetermined number of input samples are collected. For example, for a beamformer 100 having four antenna elements (i.e., N=4) and five taps (i.e., M=5), 200 sets of input samples may be collected prior to computing $R_{\overline{xx}}$. A set may comprise 20 input samples (e.g., 5 continuous samples from each channel). Computing the optimum filter coefficients, $\tilde{w}$, requires the solution of a 20-by-20 system of linear equations. Furthermore, solving this system of equations requires the inversion of a 20×20 covariance matrix, $R_{\overline{xx}}$.

To minimize the cost and the power consumption of the hardware, the processor 170 may compute the filter coefficients, $\tilde{w}$, intermittently. That is, instead of computing the filter coefficients, $\tilde{w}$, for consecutive sets of input samples, processor 170 may use the same filter coefficients, $\tilde{w}$, to process signals for a predetermined period of time, i.e., an update period, before computing new filter coefficients, $\tilde{w}$, based on a new set of input samples. The update period may depend on the stationary characteristics of the received signals. For rapidly changing signal characteristics, the update period may remain small, but for stationary signals, the update period may be increased. In an alternative embodiment, the processor 170 may compute the filter coefficients, $\tilde{w}$, based on a set of input samples distributed over the entire update period. The processor 179 may require that 1 out of 100 sets be used.

Still further the processor 170 may produce more accurate filter coefficients, $\tilde{w}$, by ignoring invalid input samples provided to the processor 170. U.S. application Ser. No. 10/035,618, filed on even date herewith in the name of Nick A. Van Stralen and Kenneth B. Welles and entitled "Method And Apparatus For Tracking Invalid Signals Through A Digital System," assigned to the assignee of the present application, which is hereby incorporated by reference, discloses a system for tracking invalid signal.

In summary, the present invention minimizes interference effects while minimizing or eliminating satellite signal distortion in a GPS receiver. The present invention further minimizes the cost and power consumption of the hardware used to calculate the filter coefficients. Still further, the present invention produces accurate filter coefficients by ignoring invalid samples.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for minimizing an effect of at least one interference signal while minimizing the distortion of at least one GPS satellite signal, the method comprising the steps of:
   receiving the at least one interference signal and the at least one GPS satellite signal by a plurality of antenna elements and processing the received signals; and
   filtering the received processed signals by a plurality of multiple tapped delay line structures based a plurality of filter coefficients,
   whereby the plurality of filter coefficients equals $R_{\overline{xx}}^{-1}C[C^H R_{\overline{xx}}^{-1}C]^{-1}F$ wherein $C^H\tilde{w}=F$, where $\tilde{w}$ equals the plurality of filter coefficients, $R_{\overline{xx}}$ equals a covariance matrix, and C and F are determined to preserve a frequency spectrum of the at least one GPS satellite signal.

2. The method of claim 1 wherein C and F are determined based on a condition that $$c_m = \sum_{n=1}^{N} w_{nm}^* e^{-j\Delta_n} \text{ for } m = 1, \ldots M,$$

where $c_m$ corresponds to coefficients of an FIR filter and are determined to preserve the frequency spectrum of the at least one GPS satellite signal and where M equals a number of taps of each plurality of multiple tapped delay line structures, N equals a number of the plurality of antenna elements, $\Delta_n$ equals a carrier frequency multiplied by a time delay at an n-th antenna element relative to a first antenna element of the plurality of antenna elements, and $w_{nm}$ equals an m-th filter coefficient for a multiple tapped delay line structure connected to an n-th antenna element.

3. The method of claim 2 wherein at least one of $c_1$, $c_2, \ldots, c_M$, is equal to one and a remainder of $c_1, c_2, \ldots, c_M$, is equal to zero.

4. The method of claim 2, wherein $c_m$ is determined based on a frequency response of the processed satellite signal.

5. The method of claim 1, wherein C and F are determined based on a condition that $$g_i = \sum_{n=1}^{N} \sum_{m=1}^{M} w_{nm}^* e^{-j\Delta_n} e^{-j\omega_i \tau_n} e^{j\omega_i kTs}$$

for at least one frequency component, $\omega_i$, of the at least one GPS satellite signal, where $T_s$ equals a sampling rate and $\tau_n$ equals an inter-element time delay at an n-th antenna element.

6. The method of claim 1 comprises the further steps of:
determining whether each received process signal is a valid signal; and
disregarding each invalid received processed signal when determining the plurality of filter coefficients and filtering the received processed signals.

7. The method of claim 1, wherein an update period for determining the covariance matrix is based on stationary characteristics of the received processed signals.

8. An apparatus for minimizing an effect at least one interference signal while minimizing the distortion of at least one GPS satellite signal, the apparatus comprising:
a plurality of antenna elements for receiving the at least one interference signal and the at least one GPS satellite signal;
a plurality of multiple tapped delay line structures operatively connected to the plurality of antenna elements for filtering the signals received by the plurality of antenna elements, respectively, wherein each of the plurality of multiple tapped delay line structures filters the signals based a plurality of filter coefficients; and
a processor for computing the plurality of filter coefficients for each of the plurality of multiple tapped delay line structure to preserve a frequency spectrum of the at least one GPS satellite signal, wherein the plurality of filter coefficients equals $R_{\overline{xx}}^{-1} C [C^H R_{\overline{xx}}^{-1} C]^{-1} F$ wherein $C^H \tilde{w} = F$, where $\tilde{w}$ equals the plurality of filter coefficients and $R_{\overline{xx}}$ equals a covariance matrix, and C and F are determined to preserve a frequency spectrum of the at least one GPS satellite signal.

9. The apparatus of claim 8, wherein the processor determines C and F based on a condition that $$c_m = \sum_{n=1}^{N} w_{nm}^* e^{-j\Delta_n} \text{ for } m = 1, \ldots M,$$

where $c_m$ corresponds to coefficients of an FIR filter and are determined to preserve the frequency spectrum of the at least one GPS satellite signal and where M equals a number of taps of each plurality of multiple tapped delay line structures, N equals a number of the plurality of antenna elements, $\Delta_n$ equals a carrier frequency multiplied by a time delay at an n-th antenna element relative to a first antenna element of the plurality of antenna elements, and $w_{nm}$ equals an m-th filter coefficient for a multiple tapped delay line structure connected to an n-th antenna element.

10. The apparatus of claim 9 wherein the processor sets at least one of $c_1, c_2, \ldots, c_M$, equal to one and a remainder of $c_1, c_2, \ldots, c_M$, equal to zero.

11. The apparatus of claim 9, wherein the processor determines $c_m$ based on a frequency response of the processed satellite signal.

12. The apparatus of claim 8, wherein the processor determines C and F based on a condition that $$g_i = \sum_{n=1}^{N} \sum_{m=1}^{M} w_{nm}^* e^{-j\Delta_n} e^{-j\omega_i \tau_n} e^{j\omega_i kTs}$$

for at least one frequency component, $\omega_i$, of the at least one GPS satellite signal, where $T_s$ equals a sampling rate and $\tau_n$ equals an inter-element time delay at an n-th antenna element.

13. The apparatus of claim 8 further comprising:
an invalid signal tracker for determining whether each received process signal is a valid signal.

14. The apparatus of claim 8, wherein the processor updates the covariance matrix based on stationary characteristics of the received processed signals.

15. A computer-readable medium on which is stored a set of instructions for minimizing an effect of at least one interference signal while minimizing the distortion of at least one GPS satellite signal wherein a plurality of antenna elements receive the at least one interference signal and the at least one GPS satellite signal and a plurality of multiple tapped delay line structures operatively connected to the plurality of antenna elements filter the signals received by the plurality of antenna elements, respectively, and each of the plurality of multiple tapped delay line structures filters the signals based a plurality of filter coefficients, which when the set of instructions are executed performs the step comprising:
determining the plurality of filter coefficients such that the plurality of filter coefficients equals $R_{\overline{xx}}^{-1} C [C^H R_{\overline{xx}}^{-1} C]^{-1} F$ wherein $C^H \tilde{w} = F$, where $\tilde{w}$ equals the plurality of filter coefficients, $R_{\overline{xx}}$ equals a covariance matrix, and C and F are determined to preserve a frequency spectrum of the at least one GPS satellite signal.

16. A computer-readable medium of claim 15, wherein C and F are determined based on a condition that $$c_m = \sum_{n=1}^{N} w_{nm}^* e^{-j\Delta_n} \text{ for } m = 1, \ldots M,$$

for m=1, ... M, where $c_m$ corresponds to coefficients of an FIR filter and are determined to preserve the frequency spectrum of the at least one GPS satellite signal and where M equals a number of taps of each plurality of multiple tapped delay line structures, N equals a number of the plurality of antenna elements, $\Delta_n$ equals a carrier frequency multiplied by a time delay at an n-th antenna element relative to a first antenna element of the plurality of antenna elements, and $w_{nm}$ equals an m-th filter coefficient for a multiple tapped delay line structure connected to an n-th antenna element.

17. The computer-readable medium of claim 16 wherein at least one of $c_1, c_2, \ldots, c_M$, is equal to one and a remainder of $c_1, c_2, \ldots, c_M$, is equal to zero.

18. The computer-readable medium of claim 16, wherein $c_m$ is determined based on a frequency response of the processed satellite signal.

19. The computer-readable medium of claim 15, wherein C and F are determined based on a condition that $$g_i = \sum_{n=1}^{N} \sum_{m=1}^{M} w_{nm}^* e^{-j\Delta_n} e^{-j\tilde{\omega}_i \tau_n} e^{j\tilde{\omega}_i kTs}$$

for at least one frequency component, $\omega_i$, of the at least one GPS satellite signal, where $T_s$ equals a sampling rate and $\tau_n$ equals an inter-element time delay at an n-th antenna element.

20. The computer-readable medium of claim 15, wherein the set of instructions further execute the step comprising:

determining whether each received process signal is a valid signal; and disregarding each invalid received processed signal when determining the plurality of filter coefficients and filtering the received processed signals.

21. The computer-readable medium of claim 15, wherein the covariance matrix is updated based on stationary characteristics of the received processed signals.

* * * * *

UNITED STATES PATENT AND TRADEMARK OFFICE
CERTIFICATE OF CORRECTION

PATENT NO.   : 6,480,151 B2
DATED        : November 12, 2002
INVENTOR(S)  : Khalil J. Maalouf et al.

It is certified that error appears in the above-identified patent and that said Letters Patent is hereby corrected as shown below:

<u>Title page,</u>
Item [57], ABSTRACT,
Line 1, "in minimized" should read -- is minimized --.
Line 6, "based a" should read -- based on a --.

<u>Column 8,</u>
Line 58, "based a" should read -- based on a --.

<u>Column 9,</u>
Line 30, "$\omega_i$" should read -- $\tilde{\omega}_i$ --.

Line 44, "effect at" should read -- effect of at --.
Line 56, "based a" should read -- based on a --.
Line 59, "structure" should read -- structures --.

<u>Column 10,</u>
Line 28, "$\omega_i$" should read -- $\tilde{\omega}_i$ --.

Line 48, "based a" should read -- based on a --.
Line 64, delete "for m=1, . . . M,".

<u>Column 12,</u>
Line 1, "$\omega_i$" should read -- $\tilde{\omega}_i$ --.

Signed and Sealed this

Thirteenth Day of May, 2003

JAMES E. ROGAN
*Director of the United States Patent and Trademark Office*